United States Patent [19]
Law et al.

[11] Patent Number: 5,261,855
[45] Date of Patent: Nov. 16, 1993

[54] SMOKE REMOVAL SYSTEM FOR VEHICLES

[76] Inventors: Herbert C. Law, 7609 E. 17th Ave., Anchorage, Ak. 99504; Edward L. McIlvaine, 5 Sexton Cove Rd., Key Largo, Fla. 33037

[21] Appl. No.: 802,322

[22] Filed: Dec. 4, 1991

[51] Int. Cl.⁵ .............................................. B60H 1/26
[52] U.S. Cl. .................................. 454/76; 454/117; 454/162; 454/164
[58] Field of Search .................. 454/76, 115, 117, 162, 454/164, 165

[56] References Cited

U.S. PATENT DOCUMENTS

| | | |
|---|---|---|
| 832,329 | 10/1906 | Mandeville et al. |
| 920,918 | 5/1909 | Cooke .................. 454/117 X |
| 1,674,535 | 6/1928 | Verville ................. 454/76 X |
| 1,790,433 | 1/1931 | Miduno . |
| 2,036,672 | 4/1936 | Anderson . |
| 2,058,659 | 10/1936 | Bellanca ................. 454/76 |
| 2,202,703 | 5/1940 | Lintern . |
| 2,268,502 | 12/1941 | Browne . |
| 2,358,690 | 9/1944 | Decker . |
| 2,730,866 | 1/1956 | Baker et al. |
| 2,868,101 | 1/1959 | Fall . |
| 3,392,654 | 3/1967 | Grenier . |
| 4,062,273 | 12/1977 | O'Connor . |
| 4,552,325 | 11/1985 | Bruensicke ............ 454/115 X |
| 4,742,760 | 5/1988 | Horstman ................... 454/76 |
| 4,807,523 | 2/1989 | Radtke et al. |

FOREIGN PATENT DOCUMENTS

| | | | |
|---|---|---|---|
| 3533069 | 3/1987 | Fed. Rep. of Germany ....... 98/2.18 |
| 252019 | 12/1985 | Japan ................................. 98/2.18 |
| 2124751 | 2/1984 | United Kingdom ................. 98/2.18 |

Primary Examiner—Robert G. Nilson
Attorney, Agent, or Firm—Seed and Berry

[57] ABSTRACT

A smoke removal system for a vehicle includes a primary smoke exit vent and a secondary smoke exit vent associated with passenger locations inside a passenger compartment of a vehicle. Each exit vent is individually, selectively operable such that only the smokers inside the passenger compartment need actuate the smoke exit vents to maintain the passenger compartment substantially smoke free. The primary exit vent may be included on an articulated arm which may be positioned proximate the smoker's head to create a capture zone that will directly remove residual or exhaust smoke exhaled by the smoker.

13 Claims, 11 Drawing Sheets

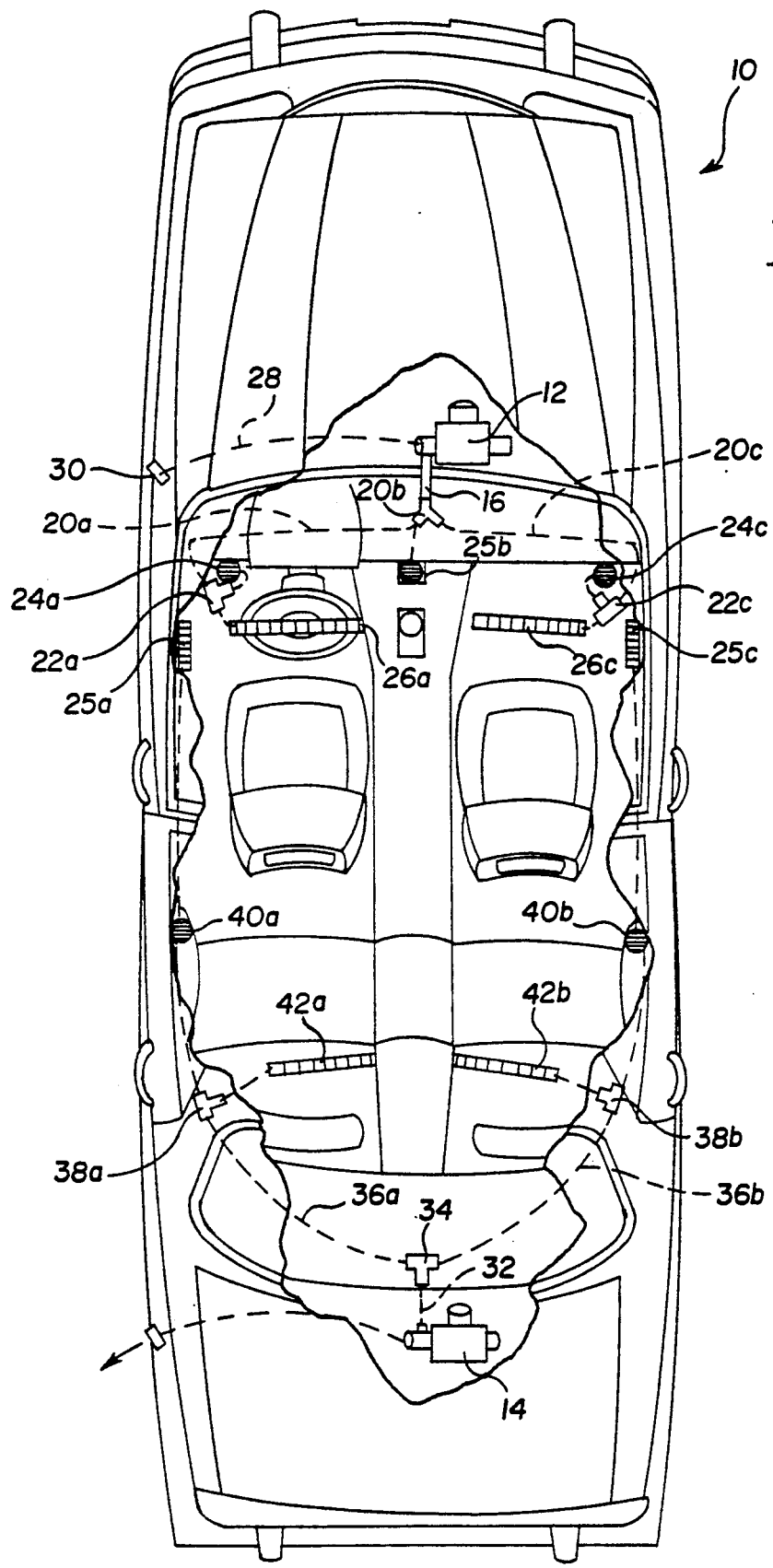

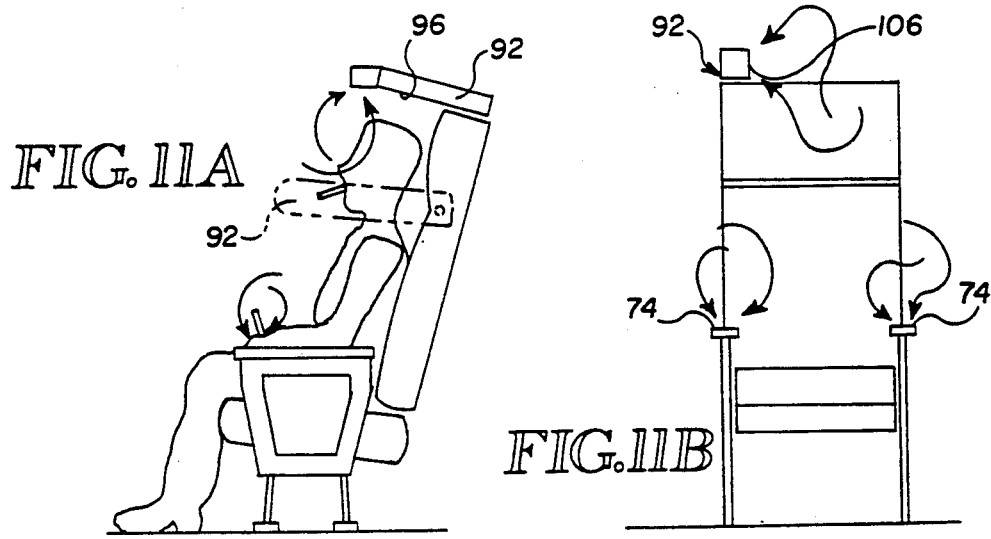
FIG. 11A
FIG. 11B
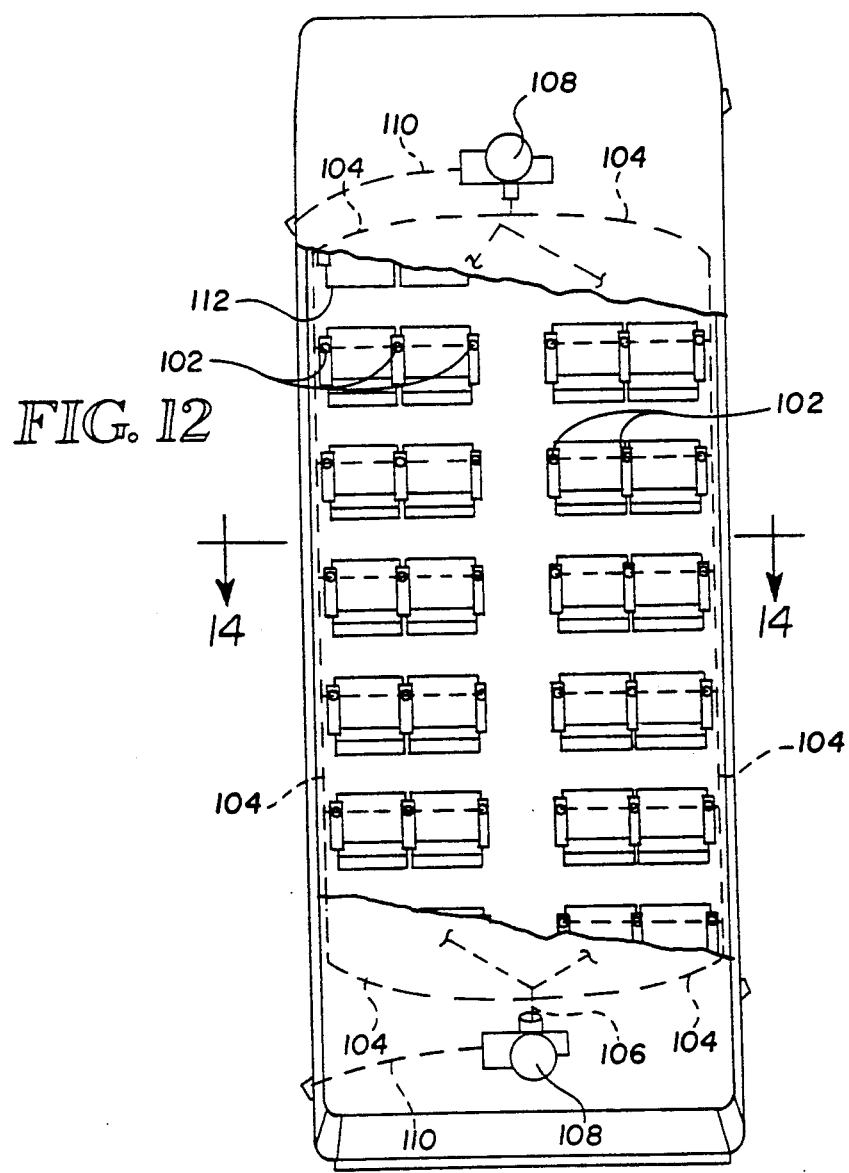
FIG. 12

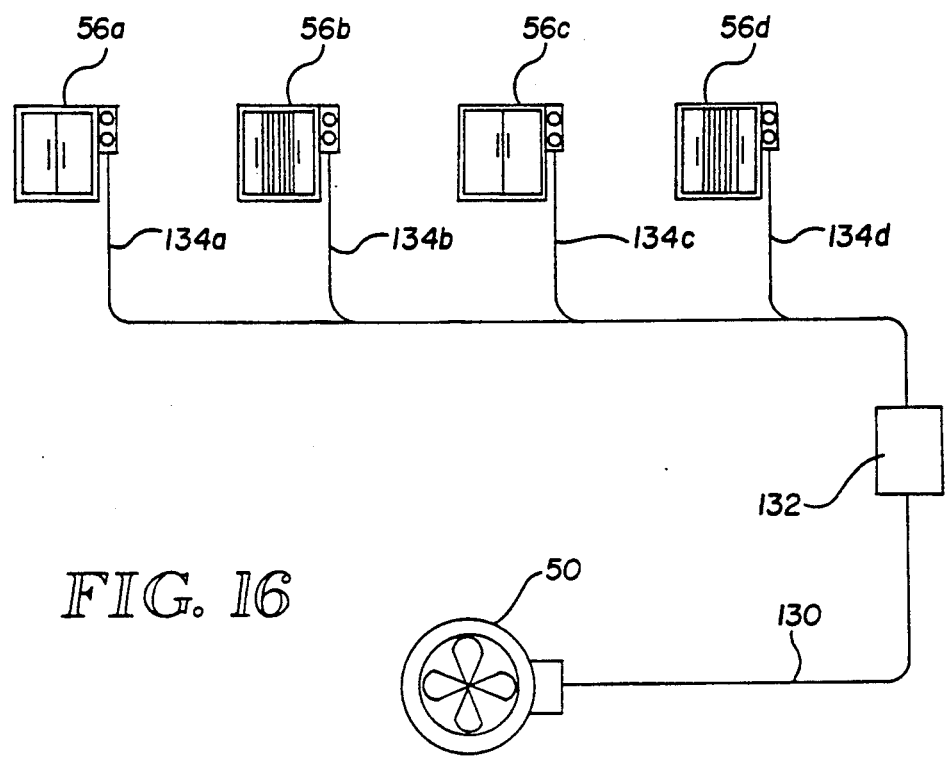
FIG. 16
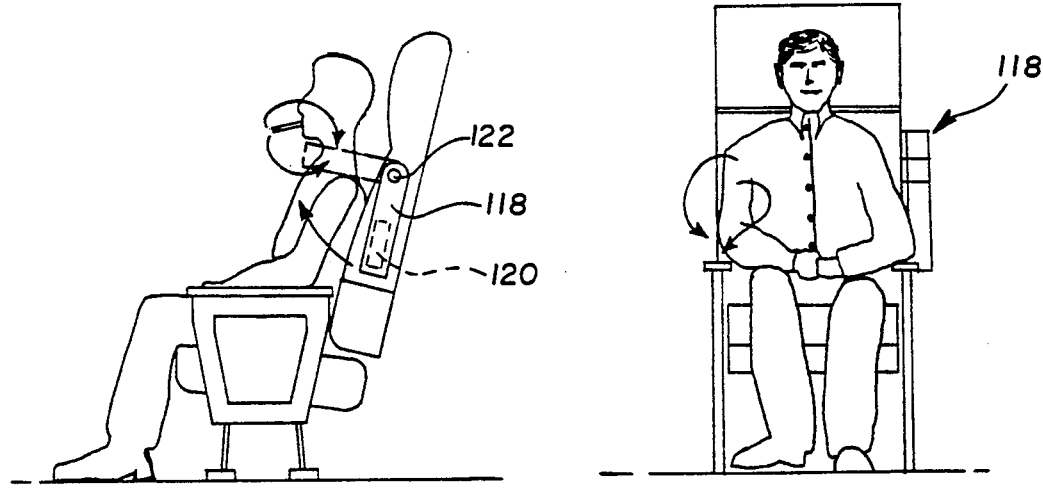
FIG. 15B
FIG. 15A

SMOKE REMOVAL SYSTEM FOR VEHICLES

TECHNICAL FIELD

This invention relates to smoke removal systems, and more particularly, to smoke removal systems for vehicles.

BACKGROUND OF THE INVENTION

The problems associated with secondhand smoke have long been recognized. Such problems may be health or nuisance related. Recently, the adverse health risks associated with inhaling secondhand smoke have become the topic of widespread concern throughout the world. Both smokers and nonsmokers have an interest to minimize and preferably eliminate secondhand smoke.

The problems associated with secondhand smoke become magnified inside of confined spaces, such as the passenger compartments of vehicles. In an automobile, for example, the problems associated with secondhand smoke are several. The persons other than the smoker inside the passenger compartment are required to inhale the secondhand smoke, possibly subjecting them to adverse health risks. The clothing of each person inside the passenger compartment, including the smoker, will become saturated with smoke. Further, the interior of the vehicle passenger compartment itself becomes covered with soot and also eventually becomes saturated with the secondhand smoke.

Attempts have been made to provide ventilation systems for removing secondhand smoke. For example, U.S. Pat. No. 4,742,760 discloses a ventilation system for removing cigarette smoke from the cabin of an aircraft. This system relies, however, on the mixture of fresh air with the contaminated air before being removed through the exhaust ducts. Therefore, such a ventilation system tends to disperse the smoke rather than directly remove the smoke from inside the passenger compartment.

The problems associated with traditional methods for removing smoke are generally associated with the problems inherent in smoking. There are two main sources of secondhand smoke: the first source is the cigarette, cigar, pipe, or other smoke source itself, and the second source is the smoker's nose or mouth from which the smoke is exhaled.

SUMMARY OF THE INVENTION

It is an object of the invention to provide a smoke removal system that directly removes secondhand smoke from the passenger compartment of a vehicle without mixing the smoke with fresh air before being removed.

Another object of the invention is to provide a smoke removal system that includes exit ducts located at the places where secondhand smoke originates so the secondhand smoke can be directly removed from the passenger compartment of a vehicle.

Still another object of the invention is to provide a smoke removal system having a selectively operable number of smoke exit vents so that the smoke removal system will operate selectively and individually depending on the number of smokers inside the passenger compartment.

Yet another object of the invention is to provide a smoke removal system having smoke exit vents that are movable to place the ducts in close proximity to the source of secondhand smoke.

Another object of the invention is to provide a smoke removal system capable of individually, selectively removing secondhand smoke from each passenger location in a passenger compartment of a vehicle.

Another object of the present invention is to provide a smoke removal system operable by means of a variable speed fan controllable by a variable switch position.

The foregoing objects, as well as other objects that will become apparent from the disclosure below, are achieved by a smoke removal system having a plurality of smoke exit vents located at various positions inside a passenger compartment of a vehicle, each exit vent drawing sufficient air to create a capture zone within the passenger compartment. The smoke removal system comprises primary and secondary smoke exit vents located adjacent each possible source of secondhand smoke. The smoke exit vent may also be movable to position the vent in close proximity with the source of secondhand smoke. The smoke removal system of the present invention may also include an optional, residual smoke exit duct for removing residual smoke that may pass beyond the capture zone of the primary and secondary smoke exit vents.

BRIEF DESCRIPTION OF THE DRAWINGS

FIG. 5 is a top plan view, partly in section, of an automotive vehicle including a smoke removal system of the present invention.

FIG. 11A is a side elevational view of a passenger seated in a seat of an aircraft having the smoke removal system of the present invention.

FIG. 11B is a front elevational view of a passenger seat in an aircraft having the smoke removal system of the present invention.

FIG. 12 is a top elevational view of a mass transit vehicle having the smoke removal system of the present invention.

FIG. 15A is a side elevational view of passenger seated in the mass transit vehicle having the smoke removal system of the present invention.

FIG. 15B is a front elevational view of a passenger seated in chair on the mass transit vehicle having the smoke removal system of the present invention.

FIG. 16 is a schematic diagram of an electrical control circuit for the smoke removal system of the present invention.

DETAILED DESCRIPTION OF THE INVENTION

Figure 1:
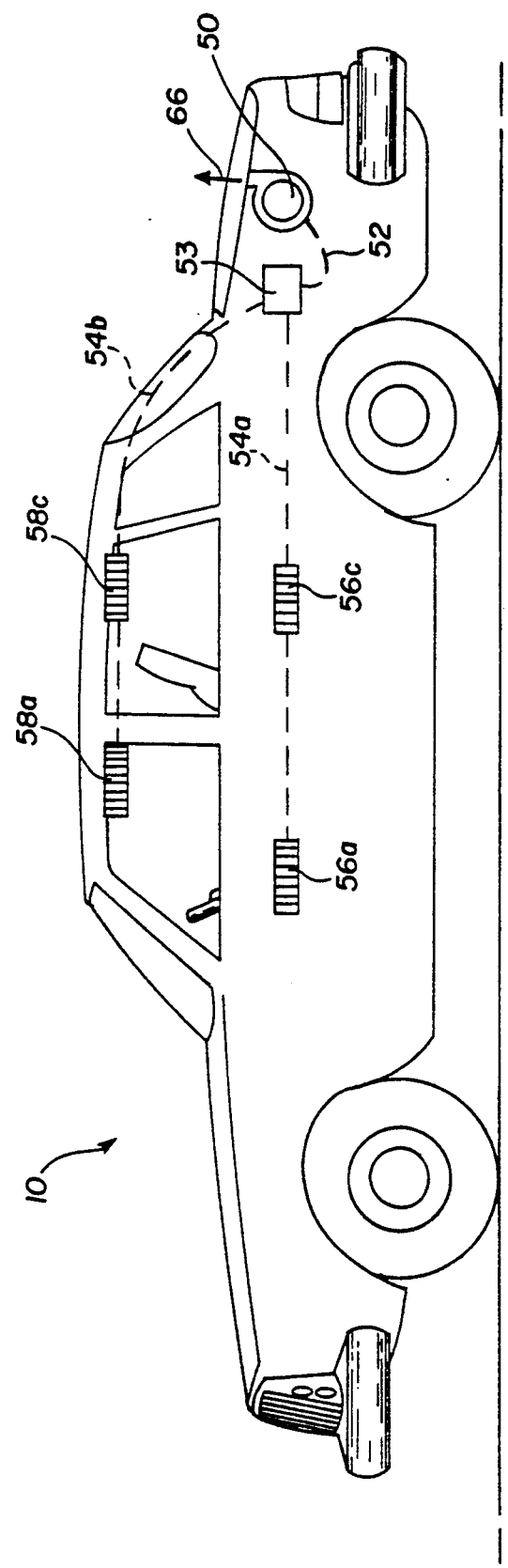
FIG. 1 is a side elevational view of an automotive vehicle including a schematic diagram of the exhaust system of the smoke removal system of the present invention with one main rear-mounted exhaust fan.

With reference to FIG. 5, one embodiment of the present invention relates to a smoke removal system for an automotive vehicle 10 which generally comprises a front exhaust fan 12 and rear exhaust fan 14. The fans 12, 14 can be of any conventional type of exhaust fan driven by any conventional drive means, such as an electric motor, and capable of operating at variable speeds so that the suction force generated by the fan will vary depending upon the number of smoke exit vents being utilized or by switch position which regulates the suction force of all the smoke exit vents.

Extending from the front exhaust fan 12 is a main suction duct 16 which branches at intersection 18 to form multiple branch suction ducts 20a, 20b, 20c. In the embodiment shown in FIG. 5, the branch suction ducts 20a, 20c divide at intersections 22a, 22c to draw air from primary exit vents 24a, 24c located near the smoker's head and secondary exit vents (not shown) located near the ashtrays for removing smoke as the smoker exhales. A secondary exit vent 25b located near an ashtray is also operatively connected to the branch suction duct 20b. Optional residual smoke exit vents 26a, 26b may alternatively be included to remove smoke that passes beyond the capture zones of the primary and secondary vents. The front exhaust fan 12 draws smoke-contaminated air in through the various exit vents, through the branch suction ducts and into the main suction duct 16. The smoke-contaminated air is forced outside the vehicle via an exhaust duct 28 through an exhaust vent 30.

Referring still to the embodiment shown in FIG. 5, the rear exhaust fan 14 includes a main suction duct 32 which branches at a first intersection 34 into branch ducts 36a, 36b which are operatively connected through intersections 38a, 38b to primary exit vents 40a, 40b and secondary exit vents (not shown). Optionall residual smoke exit vents 42a, 42b may be operatively connected to the smoke removal system to remove residual smoke from the vehicle.

The embodiment of the smoke removal system shown in FIG. 1 provides a means for obtaining a substantially smoke-free environment inside the passenger compartment of a vehicle. The front exhaust fan 12 and the rear exhaust fan 14 operate at variable speeds so that the fan can draw variable amounts of air in terms of cubic feet per minute (cfm), depending upon the number of smokers inside the vehicle 10. In one embodiment, a 2-speed variable motor will be used in connection with the front exhaust fan 12 to correspond to two persons riding in the vehicle. Similarly, a 2-speed variable motor may be used in combination with the rear exhaust fan 14 to correspond to two passengers that may ride in the rear seat of an automotive vehicle.

It is also to be understood in the present application that the smoke intended to be removed by the smoke removal system is smoke originating from cigarettes, cigars, pipes, or any other type of smoke source that a passenger may use while insider the passenger compartment of a vehicle. A primary objective, therefore, is to remove the smoke from the inside of the passenger compartment so that the disadvantages of secondhand smoke, discussed above, can be eliminated and the inside of the passenger compartment of the vehicle can remain substantially "smoke free."

Figure 6:
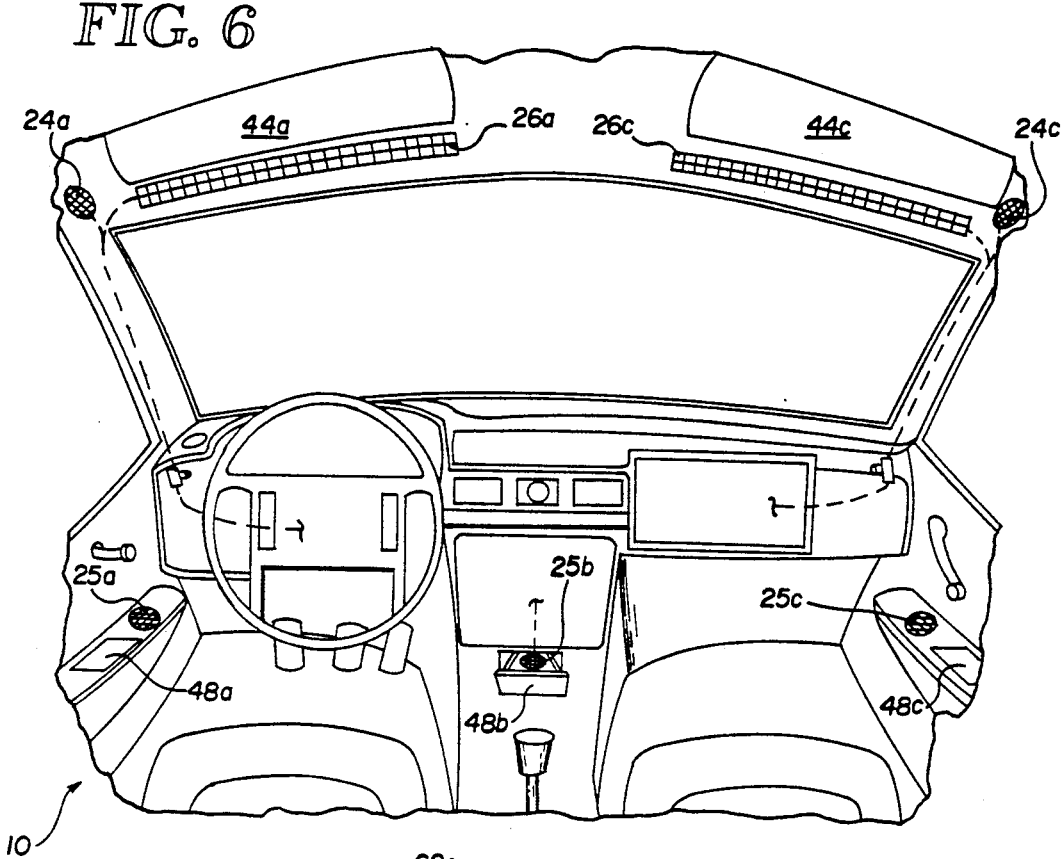
FIG. 6 is a partial sectional rear elevational view of the inside of an automotive vehicle passenger compartment having the smoke removal system of the present invention.

FIG. 6 shows in the inside of a passenger compartment of an automotive vehicle 10 which includes the smoke removal system as shown in FIG. 5. In a preferred embodiment, the primary suction ducts 24a, 24c and secondary exit vents 25a, 25b, 25c are the principal means for drawing smoke directly from the smoke source, which typically will be the cigarette, cigar, or pipe itself, and the smoker's mouth or nose. The primary vents 24a, 24c are provided in the roof of the vehicle near the sun visors 44a, 44c so that they are located as close to the smoker's head as possible. Secondary vents 25a, 25b, 25c are located adjacent the ashtrays 48a, 48b, 48c so that they are located close to the smoker's hand holding the smoke source. A premise of the invention is that the smoker can be trained to maintain the smoke source close to a secondary exit vent, such as vent 25b, and can be trained to exhale the smoke directly into a primary exit vents 24a, 24c. The combination of the primary and secondary suction vents ensures that the passenger compartment will remain substantially smoke free. Optional residual smoke vents 26a, 26c may be provided to remove any residual smoke.

Figure 2:
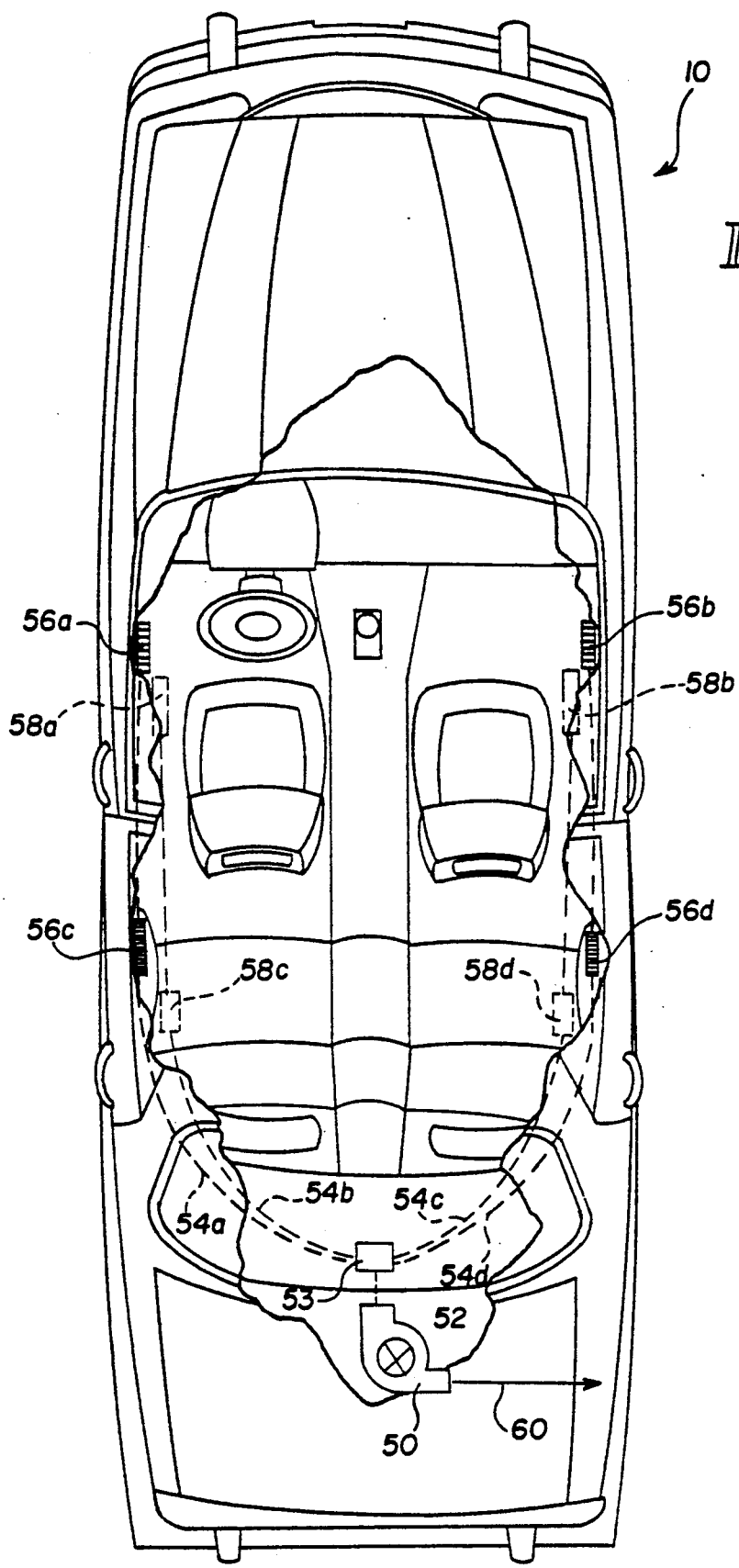
FIG. 2 is a top plan view, partly in section, of an automotive vehicle having the smoke removal system of the present invention.

FIG. 2 shows one embodiment of the smoke removal system for an automotive vehicle 10 comprising a single variable speed fan 50 operatively coupled to a main suction duct 52 which branches into branch ducts 54a, 54b, 54c, 54d which, in turn, are operatively coupled to primary exit vents 58a, 58b, 58c, 58d (shown in phantom) and to secondary exit vents 56a, 56b, 56c, 56d. In one embodiment, a flow controller 53 is operatively connected in between the main duct 52 and the branch ducts 54a, 54b, 54c, 54d to regulate the amount of air drawn through the vents 56, 58. Alternatively, a simple control switch with a variable switch position may be used. Thus, each smoke exit could be opened or closed without affecting the fan speed. Each of the primary and secondary exit vents is individually selectively controllable by the person seated adjacent the particular primary and secondary exit vents so that the smoke removal system is operable only according to the number of passengers engaged in smoking. Further, a primary and secondary exit vent is preferably provided for each potential passenger in the vehicle. All of the air drawn by the variable speed fan 50 is discharged from the vehicle via exhaust duct 60.

Figure 3:
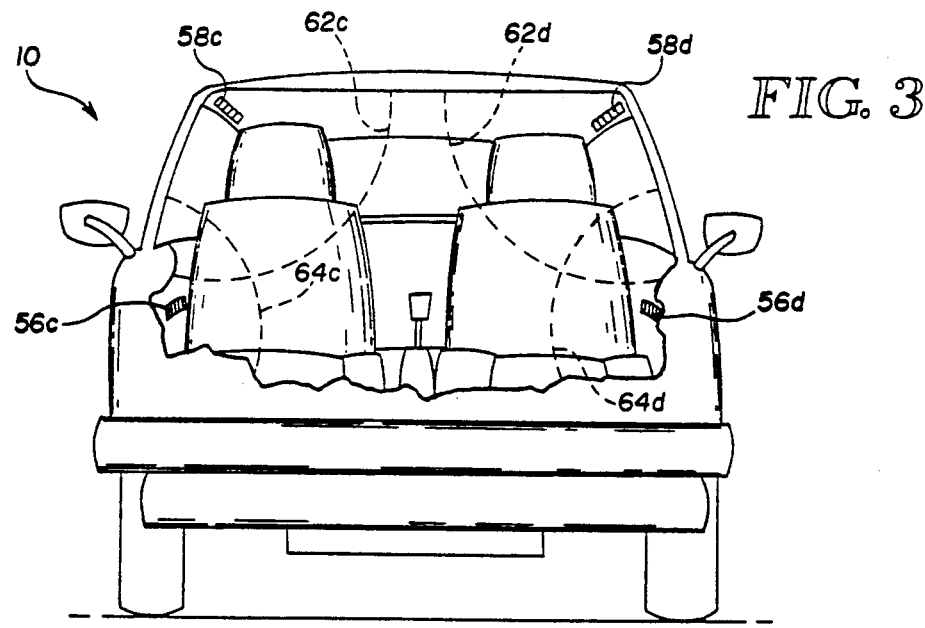
FIG. 3 is a front elevational view, partly in section, of an automotive vehicle including the smoke removal system of the present invention.

With reference to FIG. 3, secondary exit vents 56c, 56d may be mounted in the armrests of the doors adjacent ashtrays and primary exit vents 58c, 58d are located adjacent the passenger's heads. Each exit vent has associated with it a capture zone 62c, 62d and a capture zone 64c, 64d, respectively. The capture zone represents an area extending radially from each suction vent within which smoke will be drawn into the vent. The upper capture zones 62c, 62d preferably require flow rates of 80 to 200 cfm to draw smoke from areas surrounding a passenger's head. The lower capture zones 64c, 64d preferably require 80 to 150 cfm flow rates to draw smoke surrounding the secondary suction vent to draw the smoke from the smoke source into the smoke removal system and through the exhaust duct to the exterior of the vehicle. In general, any smoke within the capture zone will be taken directly from the smoke source thus substantially eliminating any residual smoke from the smoke source. It should be noted that the smoke removal system described herein utilizes suction force to remove smoke-contaminated air and does not mix the smoke-contaminated air with fresh air or use forced air to remove the smoke.

Figure 4:
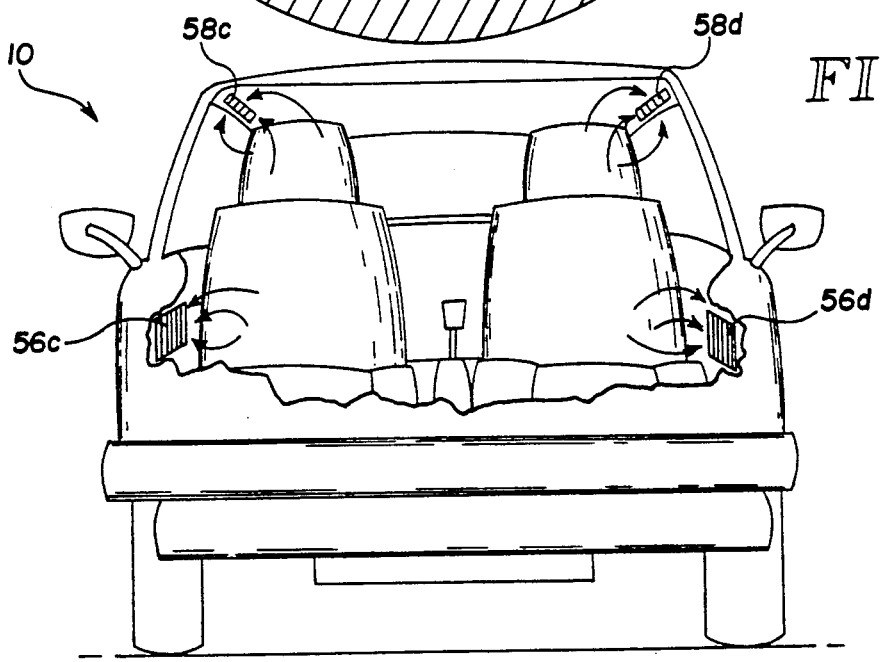
FIG. 4 is a front elevational view, partly in section, of an automotive vehicle having the smoke removal system of the present invention.

FIG. 4 shows various air currents that are created around exit vents 56c, 56d, and exit vents 58c, 58d inside the passenger compartment of vehicle 10. Such air currents will obviously vary depending on the number of exit vents being operated and depending on the operation of the heating or air conditioning inside the vehicle. The smoke removal system is intended to compensate for such variables in the flow rates for air to be drawn through the various exit vents.

FIG. 1 shows a side elevational view of a vehicle 10 with the primary exit vents 58a, 58c and the secondary exit vents 56a, 56c interconnected through branch duct 54a, 54b which pass through flow controller 53, through the main suction duct 52, and to the outside of the vehicle through exhaust duct 60.

Figure 7:
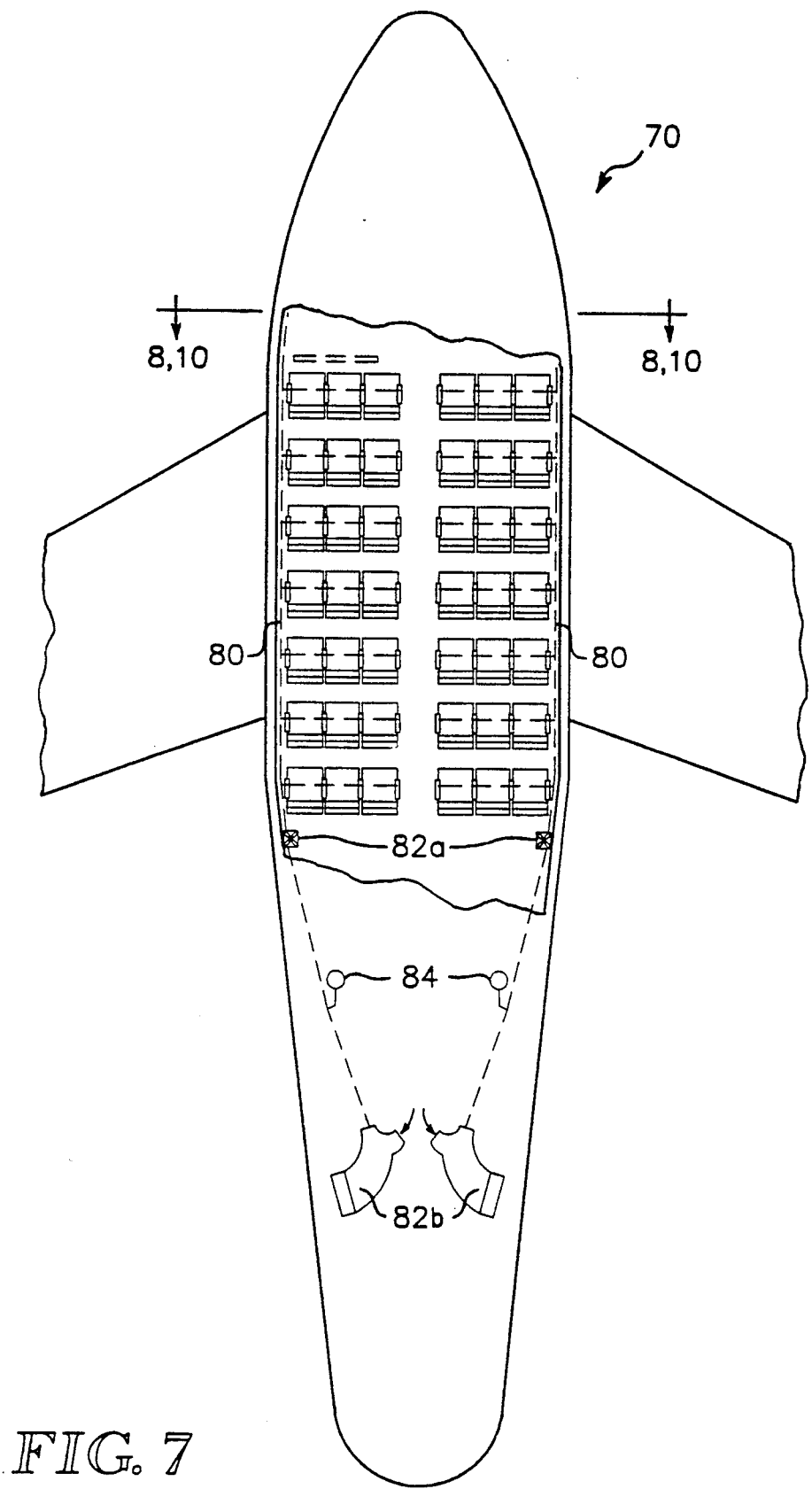
FIG. 7 is a top plan view, partly in section, of an aircraft having the smoke removal system of the present invention.

Referring now to FIGS. 7-10, an alternative application of the smoke removal system relates to an aircraft passenger vehicle 70. The aircraft smoke removal system involves multiple primary exit vents 85a, 85b which are located on an articulated arm to be positioned adjacent the smoker's head and multiple secondary exit vents 72 located adjacent ashtrays on the various arm rests. The primary exit vents 85 and the secondary exit vents 72 are interconnected through branch ducts 78 which are operatively connected to main ducts 80. Optionally, residual smoke exit vents 74 may be provided in the overhead areas of the passenger compartment. The residual smoke exit vents 74 are operatively connected to branch ducts 76 which, in turn, are coupled to the main suction ducts 80. With reference to FIG. 7, the main suction ducts 80 pass the smoke-contaminated air through aircraft outflow valves 82b to the exterior of the aircraft. When the aircraft 70 is in flight, suction is created by fans 82a which bring the contaminated air to the outflow valves 82b and subsequently to the exterior of the aircraft. Each main suction duct 80 is also operatively connected to a fire protection halon 84 which serves as a safety device for the smoke removal system plumbing.

Each of the primary exit vents 85a, 85b and the secondary exit vents 72, 74 are individually, selectively controllable so that only passengers engaged in smoking need actuate the respective suction vents to elemeintate substantially all of the secondhand smoke. Such a selectively operable system not only effectively controls secondhand smoke, but also preserves energy. Although the embodiment of FIGS. 7-10 show articulated arms 85a, 85b as being the primary exit vents, it is understood that a type of hood may be used which extends down and is located above the smoker's head.

Figure 8:
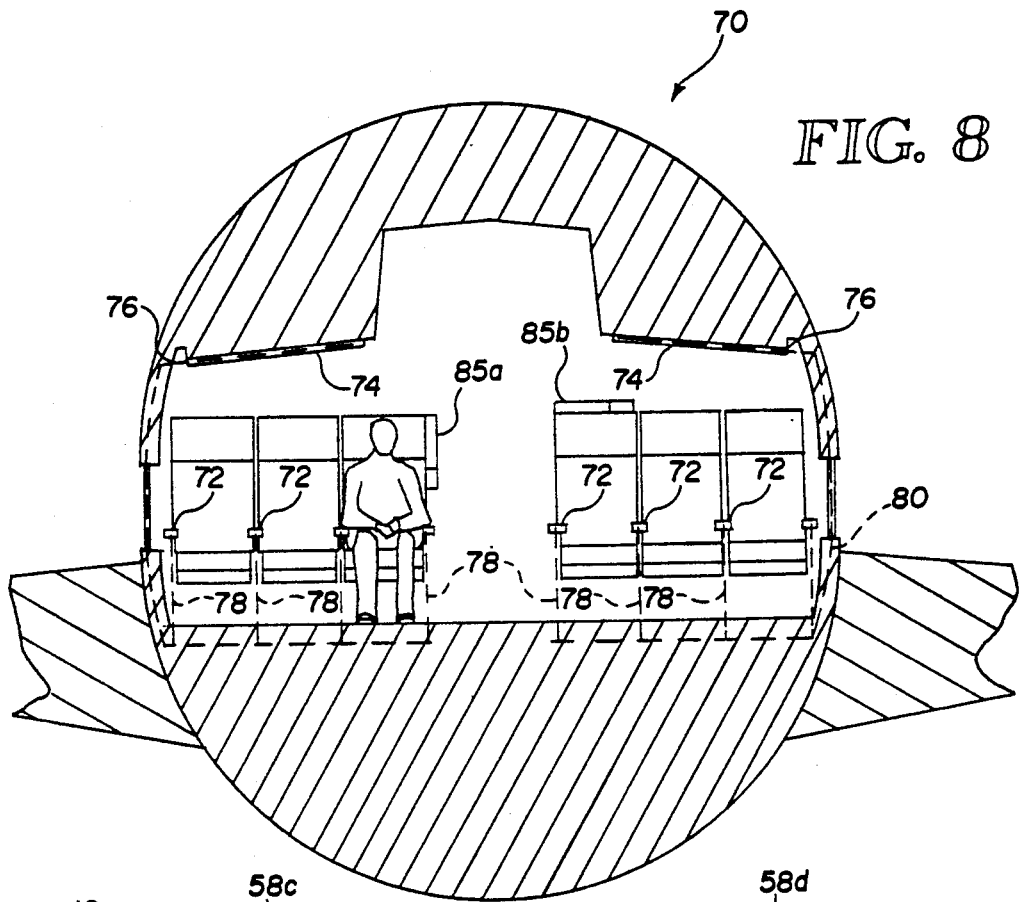
FIG. 8 is a sectional front elevational view, taken along the lines 8—8 of FIG. 7, of an aircraft having the smoke removal system of the present invention.
Figure 9:
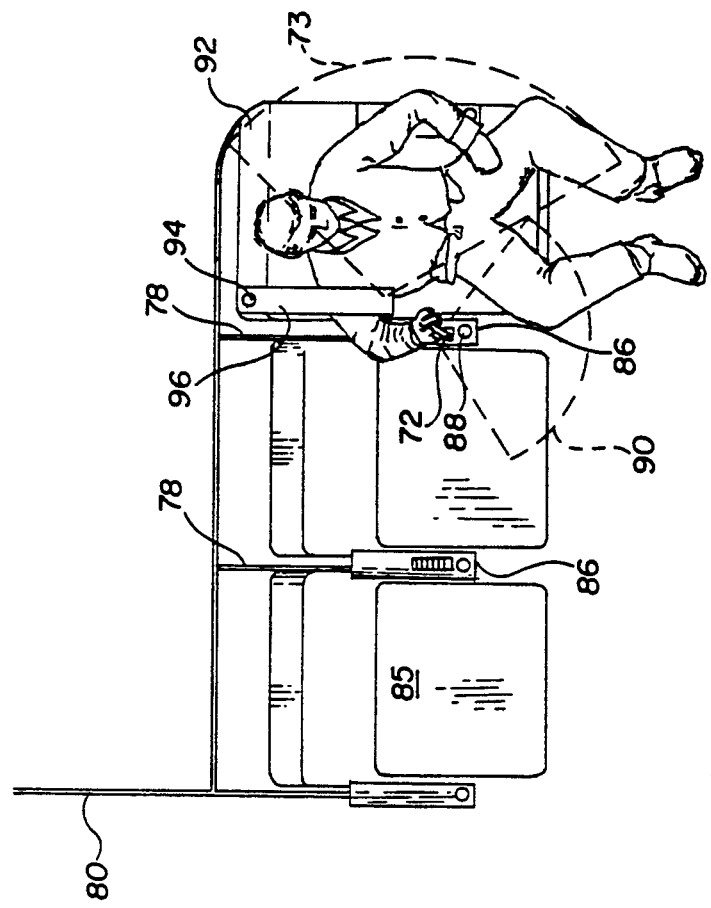
FIG. 9 is a top view of a seating arrangement inside an aircraft having the smoke removal system of the present invention.

With reference to FIG. 9, secondary smoke exit vents 72 are, in one embodiment, mounted in an armrest 86 adjacent an ashtray 88. Each secondary exit vent 72 creates a capture zone 90 which is a three dimensional area extending radially outwardly of the vent 72. Any smoke within the capture zone 90 (primarily from the cigarette, cigar, etc.) will be direcely removed through the secondary exit vent 72. Likewise, the articulated arm 92 which includes a primary exit vent 96 creates a capture zone 73 to remove any smoke exhaled by the smoker or that otherwise has entered into the capture zone 73. If any residual smoke happens to escape the capture zones 73, 90, such residual smoke will be removed by the residual exit vents 74 (FIG. 8). The capture zones will, of course, vary depending on the rate of flow through the particular exit vent. The greater the suction force, the greater the flow, and the larger the capture zone will be. For example, an 18 inch radius of capture zone will require approximately 350 to 500 cfm to pass through a duct having a 2 inch radius.

As discussed above, the airline passenger seat 85 may additionally include an articulated arm 92 which pivots about pivot point 94 to provide an additional primary exit vent 96 adjacent the smoker's head. Although the embodiment of FIG. 9 shows an arm mounted to the top of the backrest of the seat 85, it is understood that the arm may be mounted to the side of the backrest, as shown in FIG. 8. Thus, smoke exiting from the smoker's mouth or nose will be located within the capture zone of the vent 96 and will be directly removed to the exterior of the aircraft by the smoke removal system. Again, the smoker will preferably be trained to exhale the secondhand smoke directly into the primary exit vent 96 to increase the efficiency of the primary exit vent 96. The duct associated with the exit vent 96 will pass through pivot point 94 and join the series of branch ducts 78 which eventually lead to main duct 80.

Figure 10:
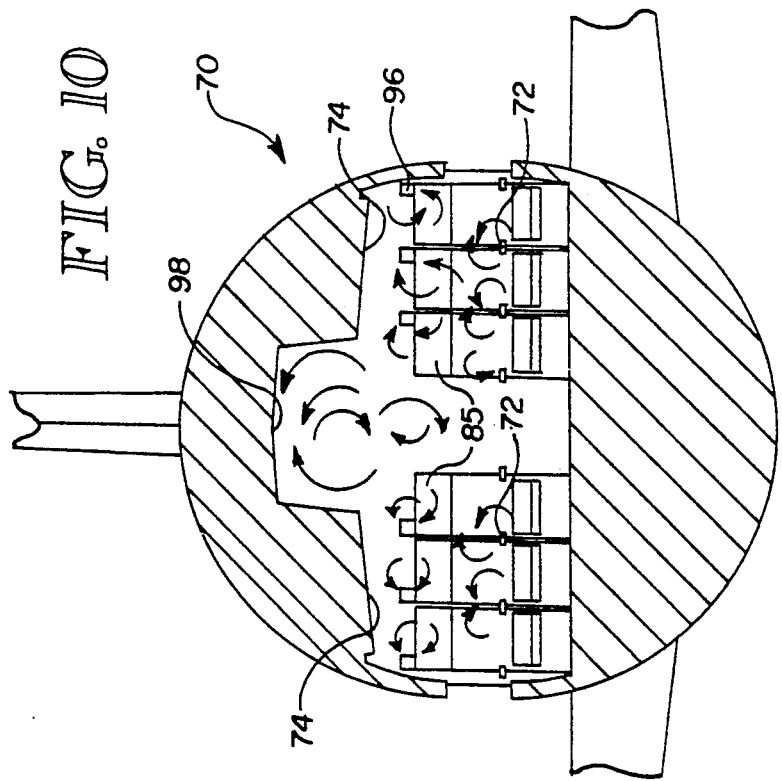
FIG. 10 is a sectional front elevational view, taken along the line 10—10 of FIG. 7, of an aircraft having the smoke removal system of the present invention.

FIGS. 10 and 11b show the typical air currents created inside a passenger compartment of a typical aircraft. In addition to the primary exit vents 96 and the secondary exit vents 72, and the residual exit vents 74, an additional residual exit vent 98 may also be placed at the uppermost portion of the passenger compartment ceiling to remove any additional residual smoke not withdrawn by the secondary suction vents 74.

A suitable capture zone for the secondary exit vents 72 for the aircraft require that the flow through the vent be between 100 and 200 cfm at the ashtray exit vent 72, which takes residual smoke from the smoke source near the ashtray. The primary exit vents 96 require a flow rate between 250 and 500 cfm to create a proper capture zone that takes the exhaled smoke from the area adjacent the smoker's head.

Figure 13:
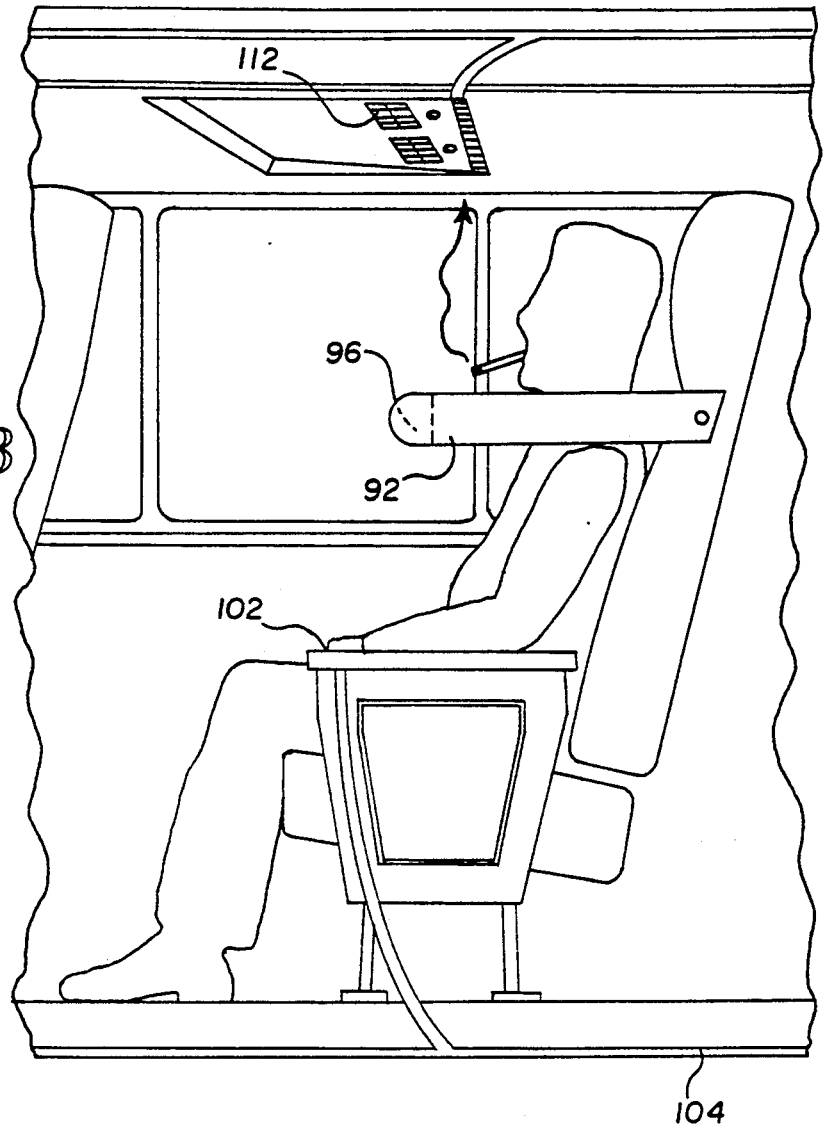
FIG. 13 is a partial side elevational view of a passenger seated inside a mass transit vehicle having a smoke removal system of the present invention showing primary and secondary capture zones.

Referring now to FIGS. 12-15, the present smoke removal system also is applicable to a mass transit vehicle 100, such as a bus. Associated with each seat is a secondary exit vent 102 for removing smoke from the smoke source. The secondary exit vents 102 are operatively coupled to branch suction ducts 104 which ultimately joint at a main suction duct 106. A variable speed suction fan 108 draws the smoke-contaminated air and passes it to the exterior of the bus via exhaust duct 110. A plurality of primary exit vents 112 (only one shown in FIG. 12) are located above the each seat of the transportation vehicle to provide a means for directly removing exhaust and residual smoke from the smoker. With reference to FIG. 13, additional exit vents 112 are located in the ceiling of the passenger compartment of the mass transit vehicle 110 and are operatively coupled to branch ducts 114, which are in turn coupled to a main suction duct 116. Smoke-contaminated air is drawn into the main duct 116 and passes through the suction fan 108 which removes the smoke from the inside of the passenger compartment.

An alternative to the primary vents 112 is shown in FIGS. 15a and 15b. An articulated arm 118 is coupled to the passenger's seat and includes a primary exit vent 120 (shown in hidden lines) for removing smoke directly from the smoker's mouth or nose. The articulated arm 118 rotates about pivot point 122 so that the vent 120 may be positioned proximate the smoker's head. The capture zone created by the vent 120 is sufficient to draw any smoke from the smoker's mouth or nose into the smoke removal system and to the exterior of the vehicle. Here again, the smoker can be trained to exhale the smoke directly into the vent 120 to increase the efficiency of the smoke removal system. The suction duct associated with the suction vent 120 passes through pivot point 122 through the passenger seat, and into the floor of the mass transit vehicle 100.

Figure 14:
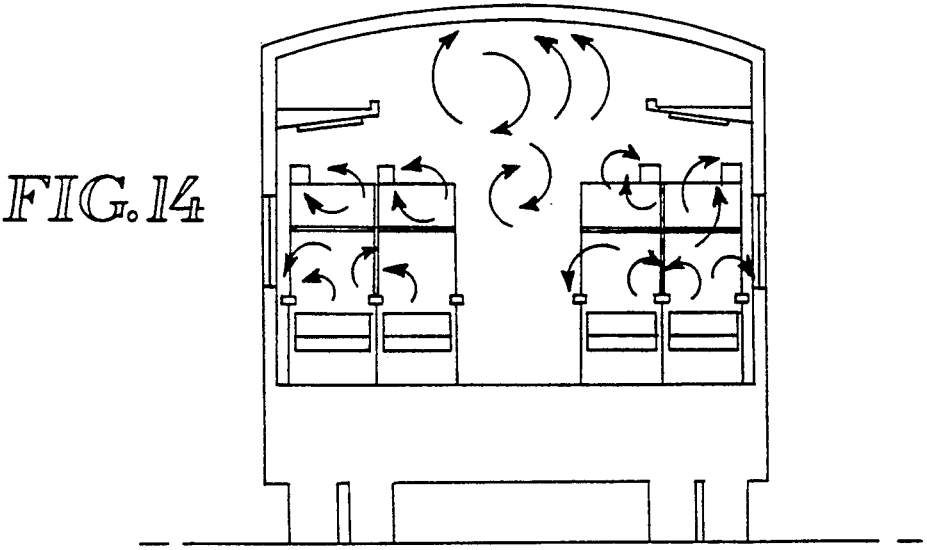
FIG. 14 is a sectional front elevational view, taken long the lines 14–14 of FIG. 12, of the mass transit vehicle having the smoke removal system of the present invention.

FIGS. 14 and 15b show the air currents typically associated with the smoke removal system in a mass transit vehicle. As mentioned above, these currents may vary depending on external factors, but generally provide sufficient indications of how the air (including smoke) will travel and need to be removed.

FIG. 16 shows a schematic diagram of a variable speed fan 50 which may be associated with any of the above-discussed exit system in any vehicle. The variable speed fan is operatively connected via lead wires 130 to a logic box 132 which controls and varies the speed at which the fan rotates to in turn create a suction force. The fan speed varies by the number of suction vents open at any given time so that the suction pressure generated by the fan remains constant. In FIG. 16, suction vents 56a and 56c remain closed, while suction vent 56b and 56d remain open. Each of the suction vents 56a, 56b, 56c, 56d are selectively, individually controllable via lead wires 134a, 134b and 134c, 134d such that the variable speed fan 50 is actuated only when one of the suction vents is opened. The means for actuating each particular suction vent may be, for example, movement of an articulated arm into an extended position adjacent the smoker's head, or any other type of switching means such as a variable switch position.

Figure 17:
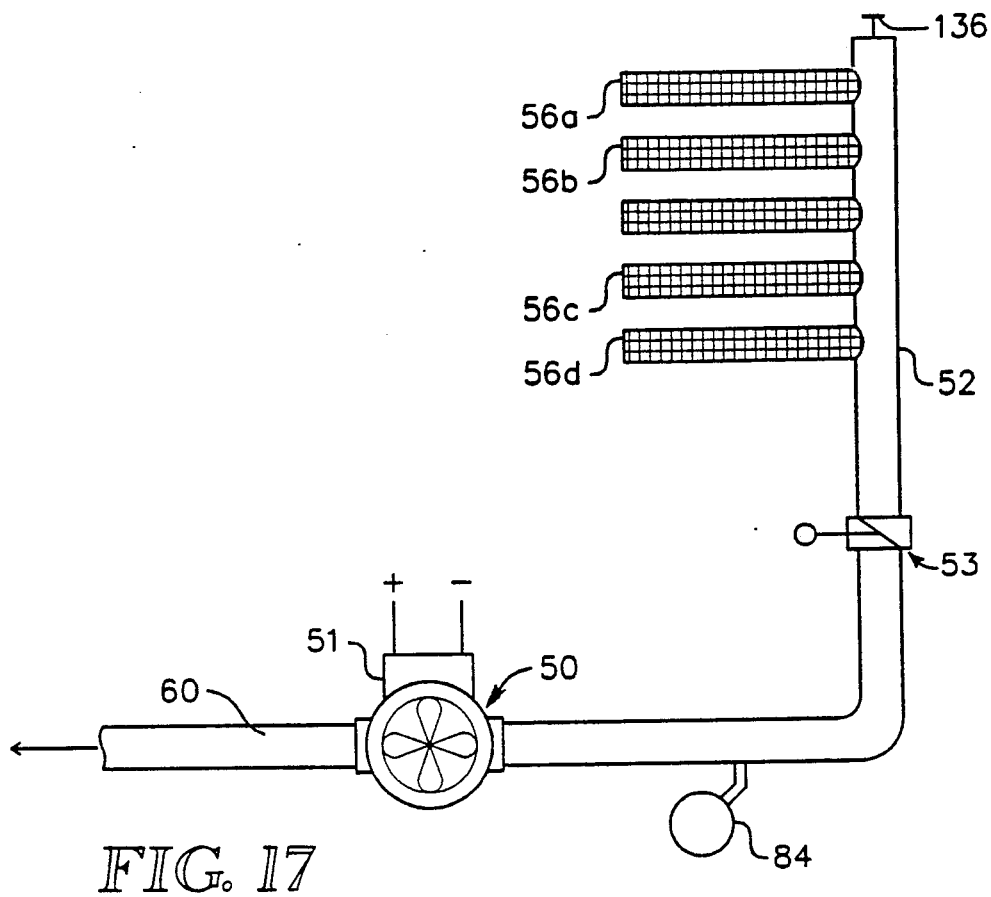
FIG. 17 is a schematic representation of the exit vents and exit ducts used in the smoke removal system of the present invention.

FIG. 17 shows a working diagram of a typical primary smoke removal duct. A variable speed fan 50 is driven by a variable speed electric motor 51, depending on the actuation device, either electrical or pneumatic, so that a constant suction is created at each of the primary suction vents 56a, 56b, 56c, 56d. The vents are operatively coupled to a main suction duct 52 which includes a flow control valve 53. The main suction duct 52 passes the smoke entering into the smoke removal section through the variable speed fan 50 and outside of the vehicle passenger compartment via exhaust duct 60. A fire detection sensor 136 is located inside the smoke system plumbing to detect an overheat suchy as fire.

Further, a fire protection halon 84 is provided in each main suction duct 52 which will activate automatically in case of fire.

Figure 18:
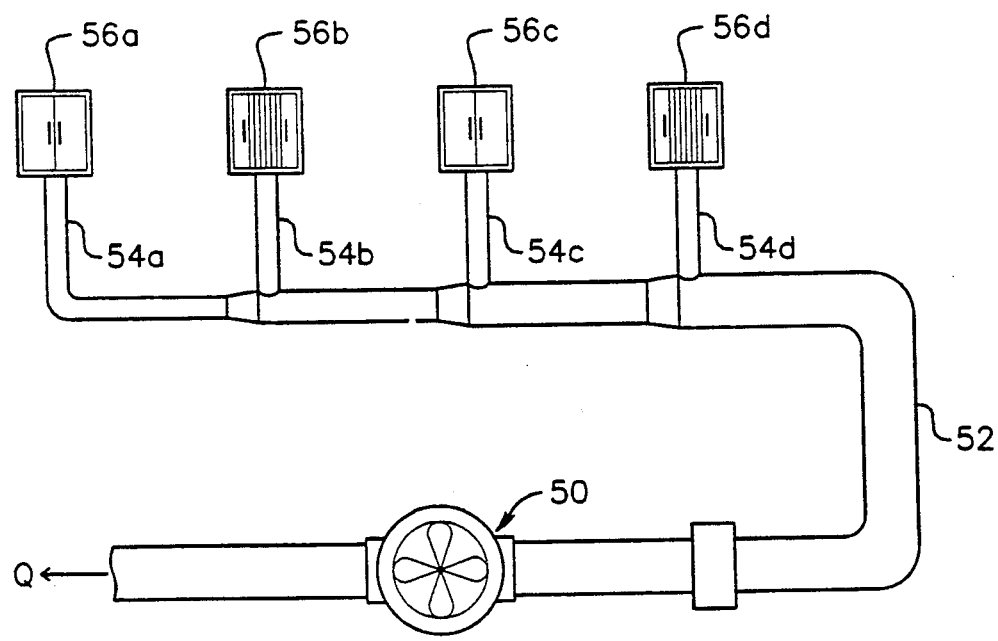
FIG. 18 is a schematic representation of a pneumatic control circuit for the smoke removal system of the present invention.

With reference to FIG. 18, an alternative actuating means for the smoke removal system may alternatively be provided by the airflow passing through each open or closed suction vent. A variable speed fan will vary depending on the number of suction vents open (56b and 56d in FIG. 18) to maintain constant the rate of flow being drawn into each particular vent. Each vent is operatively connected to the main suction duct 52 via the branch suction ducts 54a, 54b, 54c, 54d. Flow controllers or electronic logic boxes are important for complex systems to properly regulate the air flow.

For all applications, one or two fans are shown for simplicity. For larger, more complex systems, with many smoke exit vents, more fans must be used to provide adequate suction.

From the foregoing it will be appreciated that, although specific embodiments of the invention have been described herein for purposes of illustration, various modifications may be made without deviating from the spirit and scope of the invention. Accordingly, the invention is not to be limited except as by the appended claims.

We claim:

1. A smoke removal system for a passenger compartment of a vehicle, comprising:
   a plurality of smoke exit vent means located within a passenger compartment of a vehicle, each exit vent means being operatively interconnected to one another to form a primary smoke removal system, the exit vent means being located in close proximity to a potential smoke source or to an area adjacent a smoker's head where the smoke will be exhaled;
   means for creating suction at the exit vent means for capturing and drawing smoke-contaminated air from the smoke source and the area adjacent the smoker's head into the exit vent means before the smoke-contaminated air mixes with a substantial portion of clean air inside the vehicle;
   means for completely removing the smoke-contaminated air to the exterior of the vehicle;
   wherein the exit vent means adjacent the smoker's head is a primary exit vent means and a primary capture zone is created within a given distance from the primary exit vent means such that exhaled smoke is taken directly from the smoker's head and drawn into the primary exit vent means; and
   wherein the exit vent means adjacent the smoke source is secondary smoke exit vent and secondary capture zone is created around the secondary exit vent means.

2. A smoke removal system according to claim 1 wherein the secondary smoke exit vent means draw smoke directly from the secondary capture zones surrounding the smoke source such that the smoke is removed through the secondary exit vent means while remaining substantially unmixed with other air inside the passenger compartment.

3. A smoke removal system according to claim 2 wherein the suction means for drawing air into the exit vent means comprises a variable-speed suction fan located downstream of the plurality of exit vent means, the suction fan being capable of drawing a sufficient amount of airflow through each exit vent means to remove smoke contaminated air from a capture zone surrounding the inlet inside the passenger compartment.

4. A smoke removal system according to claim 3 wherein the variable speed fan is controllable by a switch having a variety of positions.

5. A smoke removal system according to claim 3 wherein the suction fan is capable of drawing a volume of air between 80 to 500 cubic feet per minute through each exit vent means depending on the size of the capture zone and the size of exit vent means, the fan being selectively controllable to maintain sufficient suction force at each exit vent means to maintain the vehicle passenger compartment substantially smoke free.

6. A smoke removal system according to claim 5 wherein the exit vent is located approximately eighteen inches from the smoke source or smoker's head and the rate of air drawn into the exit vent means is 350 to 500 cubic feet per minute.

7. A smoke removal system according to claim 5 wherein an electronic means controls the flow of air created by the variable speed fan.

8. A smoke removal system according to claim 5 wherein a pneumatic means controls the flow of air through the variable speed fan.

9. A smoke removal system for a passenger compartment of a vehicle, comprising:

a plurality of smoke exit vent means located within a passenger compartment of a vehicle, each exit vent means being operatively interconnected to one another to form a primary smoke removal system, the exit vent means being located in close proximity to a potential smoke source or to an area adjacent a smoker's head where the smoke will be exhaled;

means for creating suction at the exit vent means for capturing and drawing smoke-contaminated air from the smoke source and the area adjacent the smoker's head into the exit vent means before the smoke-contaminated air mixes with a substantial portion of clean air inside the vehicle;

means for completing removing the smoke-contaminated air to the exterior of the vehicle;

wherein the position of the exit vent means is movable such that the exit vent means can be positioned in close proximity to the mouth of the passenger; and wherein the exit vent means is located at a distal end of an articulated arm extending from a passenger seat inside the passenger compartment, the articulated arm being movable between an extended, operating position and a retracted position.

10. A smoke removal system according to claim 9 wherein the extended position is an overhead position.

11. A smoke removal system according to claim 9 wherein each exit vent means is selectively, individually operable such that one such exit vent draws air only upon actuation of the one such exit vent.

12. A smoke removal system according to claim 9 wherein the articulated arm is positioned adjacent the passenger's head when in the extended position and is positioned along the side of a passenger seat when in the retracted position.

13. A smoke removal system according to claim 9 wherein the articulated arm is positioned above the passenger's head when in the extended position and is positioned along a top surface of a backrest of the seat when the in the retracted position.

* * * * *